Nov. 25, 1930.                L. THIRY                1,782,770
                          OSCILLATING JOINT
                       Filed Oct. 26, 1925          3 Sheets-Sheet 1
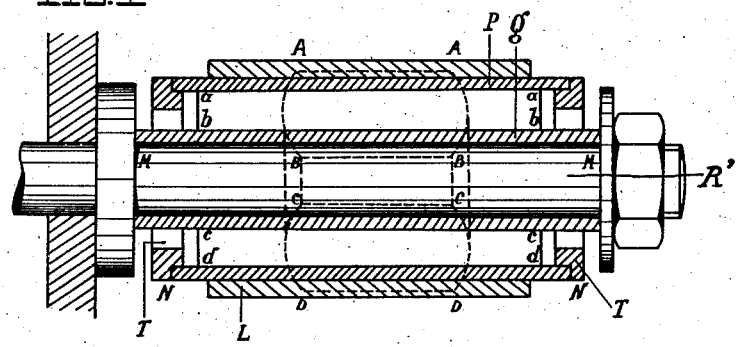
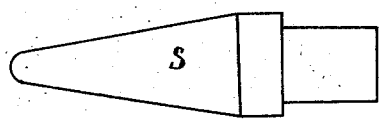
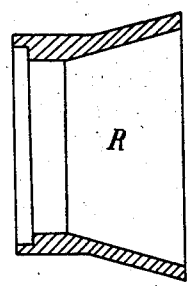
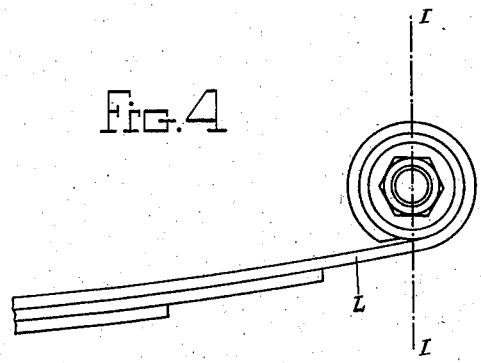
Inventor
L. Thiry
by Langner, Parry, Card & Langner
Attys.

Nov. 25, 1930.  L. THIRY  1,782,770
OSCILLATING JOINT
Filed Oct. 26, 1925   3 Sheets-Sheet 2

Inventor
L. Thiry
by Langner, Parry, Card & Langner
Attys.

Nov. 25, 1930.  L. THIRY  1,782,770
OSCILLATING JOINT
Filed Oct. 26, 1925   3 Sheets-Sheet 3

Inventor:
Leon Thiry,
Attys.

Patented Nov. 25, 1930

1,782,770

UNITED STATES PATENT OFFICE

LEON THIRY, OF BRUSSELS, BELGIUM

OSCILLATING JOINT

Application filed October 26, 1925, Serial No. 64,961, and in Belgium November 25, 1924.

This invention relates to an oscillating joint in which deformable material, or a member made of such material, is interposed between the two main mutually relatively movable elements of the joint.

Oscillating joints are known in which there is interposed, between the mutually relatively movable members, a highly compressed material which allows the relative movements by internal deformation. Experience has shown that the compressed material in movement perishes rapidly near the junction point of the material with the movable element which fact soon necessitates the frequent replacement of the compressed material. One object of the invention, among others, is to overcome this disadvantage.

The invention is applicable for oscillating joints adapted for any relative movement, such for instance as a rectilinear or circular one.

According to the invention the radial elements of material disposed along the shortest distance between a point of one of said members to the face of the other member have all been submitted to a contraction of which the ratio corresponds to the ratio of the lengthening to which each element is submitted when a relative motion is imparted to the said movable members.

In certain cases the initial deformations may be produced in any directions provided the two following conditions are observed: first to prevent sufficiently certain movements from taking place and then to allow the movements compatible with the purpose of the joint, to take place more or less easily.

The invention provides a particularly useful device in the form of a pivotal joint for suspension springs and shock absorbers for vehicle suspensions and other devices adapted for use in auto vehicular construction.

The drawings accompanying the present specification, show by way of example, various embodiments of the invention.

In these drawings:

Figure 1 shows, by means of a section taken along the line I, I in Figure 4, an oscillating joint embodying the invention.

Figures 2 and 3 are accessory members, used in forming the joint.

Figure 4 shows a view in elevation of the end of a suspension spring provided with an oscillating joint embodying the invention.

Figure 7:
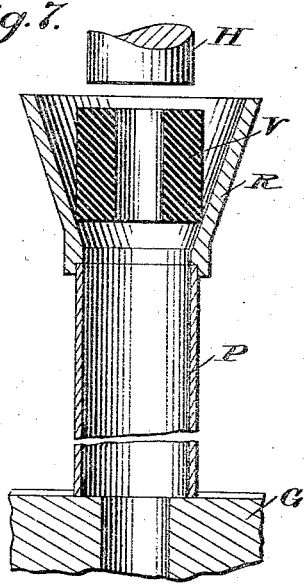
Figure 8:
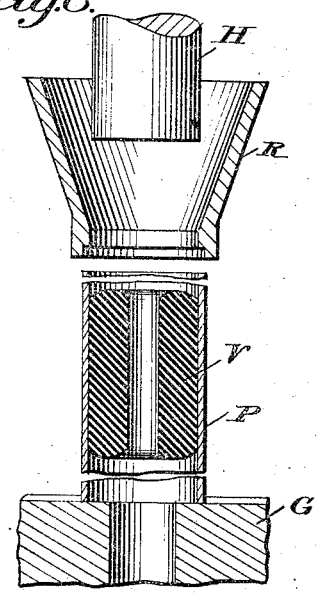
Figure 9:
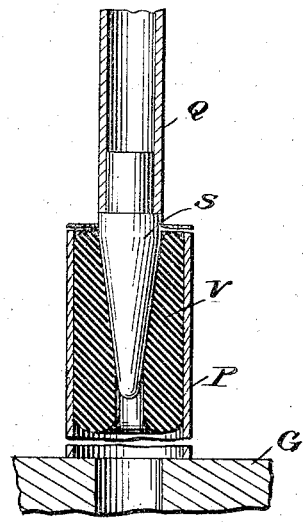

Figs. 7, 8 and 9 are cylindrical sections, largely diagrammatic, showing a method of assembling the elastic block and the rigid joint members, Figure 7 showing the block in position to be forced into the outer member, Figure 8 showing it in position in the outer member, and Figure 9 showing the tapered mandrel spreading the axial aperture in the rubber block for the insertion of the inner rigid member.

Figure 10:
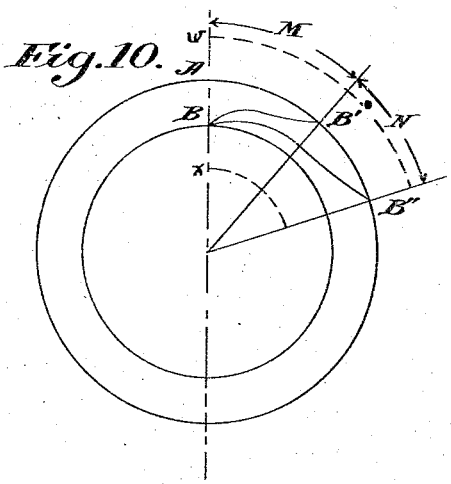

Fig. 10 is a diagrammatic view illustrating how compression of the radial elements enlarges the capacity of the rubber for oscillatory displacement.

An oscillatory pivotal joint according to the present invention may consist for example, as shown in Figure 1, of an outer sleeve or bushing P and an inner sleeve Q arranged coaxially in spaced relation.

In the space between these members is forced a member V of elastic material, for example rubber, occupying in the free state the volume bounded by the lines AA, BB, CC, DD (Figure 1). This member is made to occupy the volume bounded by the lines aa, bb, cc, dd, which will have the effect of producing a considerable stretching or deformation in an axial direction (for example the length will be doubled). By means of these initial deformations which may be carried on to any requisite extent by the application of the desired pressure, there is produced a great resistance to endwise or tilting relative movements of the members, without in the slightest degree affecting its freedom of oscillatory movement, and in fact, enhancing its amplitude of useful oscillation.

Similarly these initial stresses produce the definite adherence of the elastic material to the walls of the members P and Q with which it is in contact and will thus prevent, in a definite manner, rubbing or friction which would occur if sliding took place between the said material and one or the other of the inner or outer members. Consequently the relative angular displacements of the members P and Q about their longitudinal axes are absorbed by the internal movements or intermolecular displacements in the above-mentioned elastic material.

The amount of adherence to the walls of the inner and outer members is a function of the proportions of the external and internal diameters of the body of elastic material in the free and drawn out deformed state.

The chamber formed by the annular space is open in the directions in which the initial that is axial, deformations are to be produced and great care is taken in proportioning the initial axial length of the rubber member to the degree of radial compression to which it will be subjected so that in its state of greatest axial deformation it will be entirely contained within the annular space defined between the rigid members of the joint, by which it is meant that the ends of the rubber member must in no case, extend beyond the confines of the two rigid members, in which extended position, said ends would not be under uniform radial compressive tension, but would be free of such tension and therefore incapable of deflecting responsive to oscillation of the joint, to the same extent as is the confined portion, and the projecting ends would also lack frictional adherence to the rigid member with which they make contact so that slippage upon said member would occur, the result being generation of destructive heat, conducted by the metallic parts to the inside portions of the rubber.

Figure 1 shows that such an oscillating joint comprising, for example, two coaxial or concentric tubes containing the elastic material previously drawn out, may be constructed in the form of a commercial product capable of easy adaptation to various types of machines.

The length M, M of the central tube will in general be slightly greater than that N, N of the outer tube in order that certain axial forces will not be borne by the plates T, the use of which is optional.

In order to insert by force the deformable elastic material, use is made of conical elements R and S shown in Figures 2 and 3, which cones are fitted to the members P and Q as shown in Figures 7 to 9 the cone R is fitted to one of the ends of the outer member by means of its small base, while the cylindrical extension of the cone S will be inserted into the corresponding end of the inner member Q which has not yet been provided with its internal shaft $R^1$ to which it is fixed.

Referring to Figures 7, 8 and 9 there is illustrated a method by which an oscillating joint embodying the invention, may readily be assembled. The outer member P fitted with the funnel-like device R, shown in Figure 3, is placed on a firm support G, the annulus of rubber or other elastic material placed therein as shown, and by means of piston H forced into the position shown in Figure 8. Then as shown in Figure 9 the member Q, provided with the cone-like device S as a guide is forced into the small central concentric opening in the elastic material. The opening in the support G is of sufficient diameter to permit the device S and lower end of Q to be inserted as far as may be necessary or desired. Use may be made of a lubricant, such as water or soapy water, to assist in the insertion of the material between the members P and Q, and to prevent sticking and possible destruction of the surface fibers of the deformable material. Two or more concentric joint arrangements may be formed acting in series in order to increase the limiting angle beyond which sliding is produced.

Naturally the oscillating joint according to the invention is not limited to devices in which the material is inserted into an annular space.

It is to be noted that the insertion of the mandrel supplements or increases the compression of the rubber first effected by the forcing of the rubber member into the outer member, the radial compression causing a compensating axial deformation of the rubber which is able to take place axially in both directions, thus ensuring uniformity in the compressive stress to which the radial elements of the rubber are subjected, from one end of the rubber member to the other, ensuring the insertability of the rubber member at very high pressure. In order that the inner member may remain centralized under heavy loads, it is essential that the rubber be compressed radially to a state of substantial rigidity, and if there is not a substantially perfect freedom of movement for the material to deform axially, it jams against the surface between which it is being squeezed, adjacent the forcing means with destructive friction which makes it impossible to insert the rubber at requisite high pressure.

The diagrammatic showing in Figure 10 illustrates the principle of the rather paradoxical phenomenon that notwithstanding the radial compression with proportionate axial stretching of the rubber, no matter to what extent such compression is carried, not only is the capacity of the rubber for oscillatory deformation not restricted, but on the contrary, it is enhanced to a remarkable degree. The original thickness of the rubber block, is indicated by the broken lines $w$ and $x$. This is reduced by the radial compressive stress imposed upon the rubber to one third of its original value as indicated by the line A B.

This means that the radial element represented by the latter line is capable of extending itself three times its own length before beginning to stretch. This is true of each and every radial element. Therefore, when the joint oscillates each radial element assumes its original state of repose by lengthening three times its original length, being at the same time disposed in a spiral direction through the circumferential displacement of the parts of the joint as shown at B B'. The angle of oscillation through which the radial elements are merely permitted to extend to their original length is represented at M, and up to this point there has been no stretching of the rubber, the radial elements of which have merely recovered the original length which they had before being shortened through the forcing of the rubber member into the joint. Beyond the angle M the radial elements are capable of being extended through a further angle N by being stretched as shown at B B'', this being the only portion of the entire angle of deflection of the joint in which the radial elements are stretched.

Now, it is obvious that if the compressive tension of the radial elements is not substantially uniform from end to end of the rubber member, they will have different potential capacities for extensibility, and at different cross sections, taken perpendicular to the axis of the joint, the part M of the entire angle of deflection of the joint will vary, having a greater value at cross sections where the radial elements are under relatively high compressive stress and having a lower value at points where the radial elements are under less compressive stress, the result being that the complementary parts N of the entire angle of deflection will be correspondingly varied, representing unequal stretching of the radial elements at different cross sections. By this unequal stretching of the rubber in different parts, destructive internal heating would arise which is avoided by the principle of the present construction.

It is to be noted that in a general manner the deformed material also permits small relative displacements to take place in the direction of the deformations of the said material, the magnitude of these small relative displacements depending upon the amount of the above mentioned initial deformations. For instance, when the invention is applied to an oscillating joint, as shown in Figure 1, the inner member Q may partake of small transverse movements, relative to P. The use of these small transverse displacements is seen in certain cases of application of the invention in which it is necessary not only to provide for the angular displacement or oscillations between the members, but also to permit secondary small displacements between them.

With reference more particularly to the oscillating joints of suspension springs in the case shown in Figures 1 and 4, the tube Q is keyed or otherwise secured to the shaft $R_1$ fixed to the frame and the invention will provide not only for the angular displacements of the member P acting like a socket and consequently for the oscillation of the end of the main leaf of the spring relatively to the member Q, but it will also permit slight relative displacements of these members in all other directions. Referring to Figure 1, the members P and L may, for instance, take up a position which is slightly inclined in direction relative to the member Q which is absolutely fixed since it is integral or virtually integral with the shaft $R_1$. Consequently the twisting forces to which the springs are subjected about their longitudinal axis when the vehicle is in motion will be absorbed to a great extent by the deformed material of the oscillating joint. In this way frequent breakage of the springs will be avoided.

Figure 5:
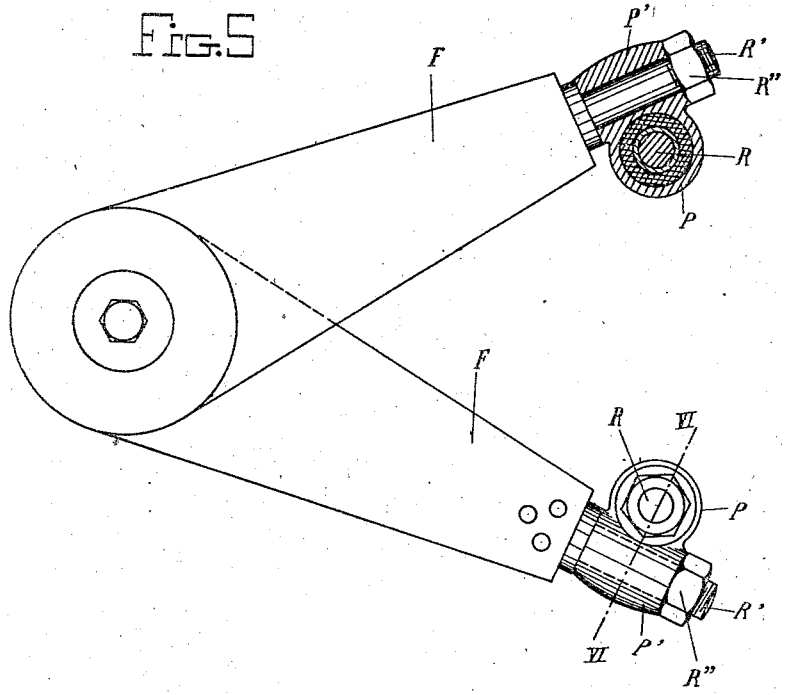
Figure 5 is a view in elevation with a part in section of a shock absorber for the suspension of a vehicle provided with a joint embodying the invention.
Figure 6:
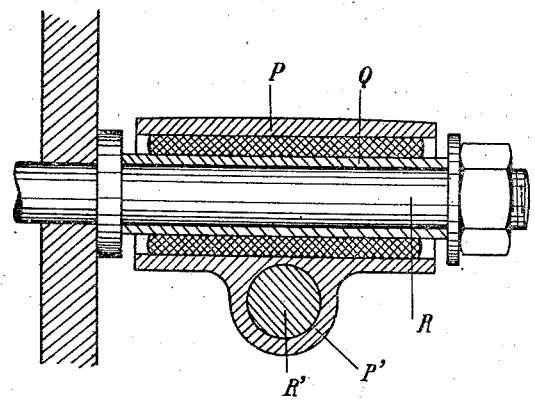
Figure 6 is a section taken along the line VI, VI in Figure 5.

The property of the oscillating joint according to the invention of permitting, apart from large angular displacements about the longitudinal axis of the joint, small displacements about any axes, will make it possible for the joint to also be employed in shock absorbers of the scissors type shown in Figures 5 and 6. This shock absorber is formed by two arms F the pivotal joint between which is controlled by a suitable known device the ends of which arms are attached respectively to the frame of the vehicle and to the axle by shafts $R_1$. Up to the present this type of shock absorber has been constructed in such a manner that about the fixed shaft $R_1$ there turns a socket P attached to another socket P' arranged at right angles to the first one and in which is also journalled a shaft R' attached to the arm F. This type of shock absorber necessitates therefore two pivoting oscillative devices arranged at right angles, the pivoting about the shafts $R_1$ being provided for the purpose of allowing the two branches F to pivot about their common shaft, which pivoting is controlled according to the known principle upon which the shock absorber works while the pivoting movement about the shafts R' is provided for the purpose of enabling the arms F to be maintained in one and the same plane without subjecting upon them to the action of any twisting force in spite of the possible relative inclinations of the shafts $R_1$ attached to the frame and to the vehicle respectively.

The application of the invention to this type of shock absorber will enable the pivoting shaft R' to be locked in its socket by a nut R'' screwed upon its end, the small displacements previously taking place between the shaft R' and the outer member of the joint R' being absorbed, according to the invention, by the deformed material arranged about the shaft $R_1$.

It will therefore be understood from the two previous examples that the joint according to the invention is of particularly advantageous use in all cases where it is necessary to absorb not only the relative angular displacements or oscillations about the longitudinal axis of the pivotal joint but also small displacements about any axes.

The devices described above may also be employed advantageously for forming other various pivots and pivotal joints usually present in automobile vehicles. In the case of the application of the invention to the pivotal joints of suspension springs and shock absorbers it is further observed that when the movements about the pivoting shaft exceed a certain amplitude (in degrees), the resistance offered by the interposed elastic material increases much more rapidly than in proportion to the amplitude.

As a consequence, at the end of the stroke, which, when an obstacle is met corresponds to the limit of absorption of the springs, a buffer effect is produced which is capable of effectively assisting the springs to either prevent the shock upon the axles or to considerably decrease it.

It is to be noted that in order that ordinary pivotal joints may be easily replaced by joints constructed according to the invention, provision is also made, according to the invention, for constructing an arrangement comprising a socket, a pivot and interposed material, for the inner member Q acts as the pivot and the outer member P as the socket.

According to the features described, this arrangement being intended for the easy replacement of ordinary oscillating joints, it goes without saying that there may be provided for this purpose suitable fixing members which enable a socket and its pivot to be connected one to each of the two members which make a relative displacement.

What I claim is:

1. An oscillatory pivotal joint for vehicles comprising inner and outer relatively oscillatory coaxial cylindrical elements forming between them an annular space, and an annular rubber cylinder of which in its original unstressed condition, the radial thickness is greater than the width of the annular space between said cylindrical elements, said rubber cylinder being held between said cylindrical elements under radial compressive tension and being in freely deformed state axially in compensation for the radial compression thereof, whereby substantial uniformity in the shortening of the radial element of said rubber cylinder is produced, the opposite ends of said rubber cylinder being free from contact with any end structure.

2. The method of making an oscillatory pivotal joint with rubber articulation comprising fitting a block of rubber formed with an aperture, in a rigid sleeve, then spreading the aperture with a tapered mandrel, thereby creating radial compressive tension between the sleeve and said mandrel and permitting the consequent deformation of said rubber block axially in both directions, then inserting in said aperture while spread, a rigid member of larger cross section dimensions than that of the original aperture.

3. The method of making an oscillatory pivotal joint with rubber articulation comprising fitting a block of rubber formed with an aperture, in a rigid sleeve, then spreading the aperture with a tapered mandrel, thereby creating radial compressive tension between the sleeve and said mandrel and permitting the consequent deformation of said rubber block axially in both directions, then inserting in said aperture while spread, a rigid member of larger cross section dimensions than that of the original aperture, and causing the ends of said rubber block to be wholly included within the annular space defined between planes perpendicular to the axis of said block and intersecting the inner and outer rigid members.

4. An oscillatory pivotal joint comprising spaced apart rigid members and a rubber member of initially radial thicknesses greater than the radial distances between the two joint members held by compressive pressure within the space between the joint members and frictionally united to the same by the reaction pressure incident to its deformation, the axial length of said rubber member being such that in its maximum state of deformation it is wholly included between planes perpendicular to said axis and intersecting both of said rigid members so that all the mass of the rubber member is subjected to the radial reductions.

In testimony whereof I have signed my name to this specification.

LEON THIRY.